United States Patent
Barber et al.

(10) Patent No.: US 11,526,600 B2
(45) Date of Patent: Dec. 13, 2022

(54) TAINT TRACKING VIA NON-INTRUSIVE BYTECODE INSTRUMENTATION

(71) Applicant: SAP SE, Walldorf (DE)

(72) Inventors: Thomas Barber, Stutensee (DE); David Klein, Braunschweig (DE); Martin Johns, Braunschweig (DE)

(73) Assignee: SAP SE, Walldorf (DE)

( * ) Notice: Subject to any disclaimer, the term of this patent is extended or adjusted under 35 U.S.C. 154(b) by 90 days.

(21) Appl. No.: 17/127,772

(22) Filed: Dec. 18, 2020

(65) Prior Publication Data

US 2022/0197998 A1    Jun. 23, 2022

(51) Int. Cl.
| | |
|---|---|
| *G06F 21/54* | (2013.01) |
| *G06F 21/62* | (2013.01) |
| *G06F 21/55* | (2013.01) |
| *G06F 21/56* | (2013.01) |

(52) U.S. Cl.
CPC ............ *G06F 21/54* (2013.01); *G06F 21/554* (2013.01); *G06F 21/566* (2013.01); *G06F 21/6245* (2013.01)

(58) Field of Classification Search
CPC .......... G06F 21/50; G06F 21/52; G06F 21/54; G06F 21/55; G06F 21/554; G06F 21/556; G06F 21/60; G06F 21/62; G06F 21/6218; G06F 21/6245

See application file for complete search history.

(56) References Cited

U.S. PATENT DOCUMENTS

| | | | |
|---|---|---|---|
| 10,783,243 B2 | 9/2020 | Loch et al. | |
| 2014/0173571 A1* | 6/2014 | Gluck | G06F 11/3636 717/130 |
| 2021/0326446 A1* | 10/2021 | Cao | G06F 21/54 |

OTHER PUBLICATIONS

Bell et al., "Phosphor: Illuminating Dynamic Data Flow in Commodity JVMs," In Proceeding of the 29th ACM SIGPLAN Conference on Object Oriented Programming Systems Languages and Applications, 2014, 19 pages total.

Lekies et al., "25 Million Flows Later—Large-scale Detection of DOM-based XSS," CS '13: Proceedings of the 2013 ACM SIGSAC conference on Computer & communications security Nov. 2013 pp. 1193-1204 https://doi.org/10.1145/2508859.2516703.

(Continued)

*Primary Examiner* — Daniel B Potratz
*Assistant Examiner* — D'Arcy Winston Straub
(74) *Attorney, Agent, or Firm* — Buckley, Maschoff & Talwalkar LLC

(57) ABSTRACT

Various embodiments of systems and methods to track tainting information via non-intrusive bytecode instrumentation are described herein. The described techniques include, at one aspect, defining a taint-aware class to shadow an original data class. The taint-aware class includes a payload field to store objects of the original data class, a metadata field to store tainting information corresponding to the objects of the original data class, and a method proxying a corresponding method of the original data class. In another aspect, the instances of the original data class are replaced with corresponding instances of the taint-aware class in an application bytecode. Further, in a yet another aspect, when executing the application in a runtime environment, the method propagates the content of the metadata filed and calls the corresponding method of the original data class to manage the content of the payload field.

17 Claims, 7 Drawing Sheets

(56) References Cited

OTHER PUBLICATIONS

Loch et al., "Hybrid Taint Analysis for Java EE," In Proceedings of the 35th Annual ACM Symposium on Applied Computing (SAC '20). Association for Computing Machinery, New York, NY, USA, 1716-1725. DOI: https://doi.org/10.1145/3341105.3373887.
Shipilev, "JEP 280: Indify String Concatenation," OpenJDK website, 2015, http://openjdk.java.net/jeps/280, 4 pages total.

\* cited by examiner

```
1 String foo(String arg) {
2 if("bar".equals(arg)) {
3 return "Equal";
4 }
5 return "NotEqual";
6 }
```
405

```
1 java.lang.String foo(java.lang.String);
2 descriptor: (Ljava/lang/String;)Ljava/lang/String;
3 Code:
4 0: ldc #2 // String bar
5 2: aload_0
6 3: invokevirtual #3 // Method java/lang/String.equals:(Ljava/lang/Object;)Z
7 6: ifeq 12
8 9: ldc #4 // String Equal
9 11: areturn
10 12: ldc #5 // String NotEqual
11 14: areturn
```
410

```
1 com.sap.TString foo(com.sap.TString);
2 descriptor: (Lcom/sap/TString;)Lcom/sap/TString;
3 Code:
4 0: ldc #2 // String bar
5 2: aload_0
6 3: invokevirtual #3 // Method com/sap/TString.equals:(Ljava/lang/Object;)Z
7 6: ifeq 12
8 9: ldc #4 // String Equal
9 11: areturn
10 12: ldc #5 // String NotEqual
11 14: areturn
```
415

```
1 String str = (String) Class.forName("java.lang.String")
2 .getConstructor()
3 .newInstance();
```
420

FIG. 4

TAINT TRACKING VIA NON-INTRUSIVE BYTECODE INSTRUMENTATION

BACKGROUND

Cyber-attacks involving incoming dataflows have become widespread in the recent years. For example, code injection attacks (e.g., involving client-side cross-site-scripting (XSS), tampering structured query language (SQL) clauses, etc.) use incoming dataflows (e.g., user input) to affect the execution of various applications. Dynamic dataflow tracking ("tainting") is a powerful technique to mark and monitor potentially harmful dataflows in applications. Tainting is a known approach also in the field of data-protection and privacy. A taint-aware framework can be used to assign and track the flow of personal information through a program and could be used to ensure compliance with data-protection laws such as the European General Data Protection Regulation (GDPR).

The methods for dynamic dataflow tracking involve monitoring specialized meta, referred to also as taint information, assigned to potentially interesting dataflows ("taint tracking"), e.g., through applications being executed. Typically, such tracking or monitoring is performed within runtime environments where it may impact negatively the overall performance. Moreover, taint tracking mechanisms are typically added to existing runtime environments (e.g., based on technologies such as Java™ PHP™, Node.js™) and therefore, modify the runtime environments in a non-pluggable manner. Such modifications can affect the portability and maintainability of the runtime environments where applications can be monitored during execution.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 4 shows exemplary Java based code snippets illustrating bytecode code instrumentation, according to one embodiment.

DETAILED DESCRIPTION

Embodiments of techniques for taint tracking via non-intrusive Java bytecode instrumentation are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

A dynamic dataflow tracking mechanism can be realized with a tainting framework that includes three functional elements. The first element could be a mechanism to mark or identify sources and security sensitive consumers of potentially insecure data. Such data is tainted, e.g., corresponding tainting information (metadata) is assigned to flag the potential risk. For example, sources of potentially insecure data can be applications where users may input or otherwise inject malicious data to be processed at a server. Security sensitive consumers are usually called sinks and may represent, for example, applications or systems storing sensitive information (e.g., personal data).

Another element of the tainting framework may be described as a mitigation policy that is applied when tainted data arrives at a sink. There are various scenarios or approaches for such mitigation or reaction on the receiving of tainted data, e.g., depending on the type of the sinks. In most cases, the receiving or consuming applications are warned by the assigned metadata (the tainting), and trigger algorithms to further analyze the received data, or relevant parts of it, before and/or during and/or after it is processed.

Figure 1:
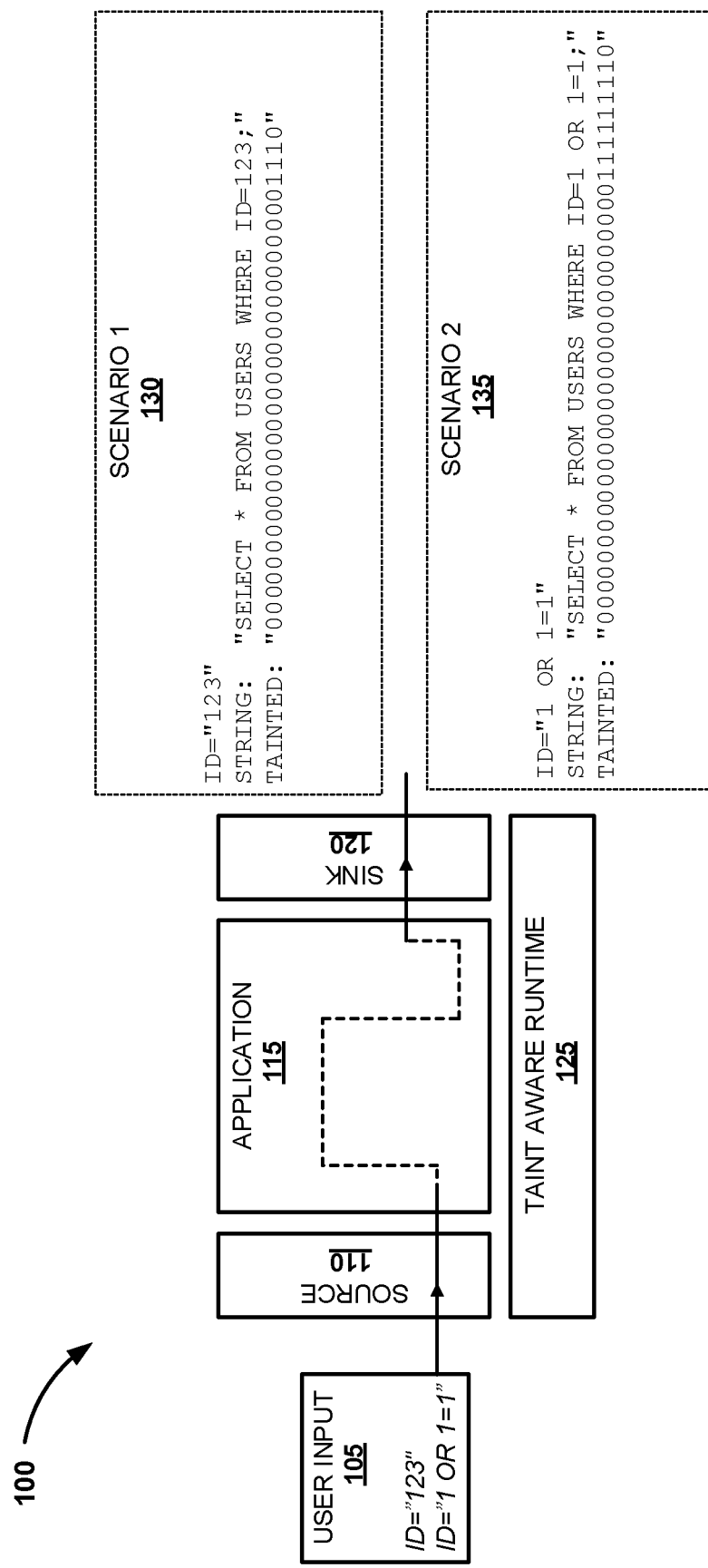
FIG. 1 is a block diagram illustrating a computing environment where tainting framework is implemented, according to one embodiment.

In this document, the focus is on the third functional element that the typical tainting frameworks include, namely, a mechanism to track tainted dataflows from sources to sinks. FIG. 1 illustrates computing environment 100 that implements tainting, according to one embodiment. As shown in the figure, user input 105 is provided and passed to a taint-aware runtime 125 via source 110, to be processed at sink 120.

In the vast majority of cases, the potentially damaging user inputs are provided as strings. Furthermore, HTTP (Hypertext Transfer Protocol) is a text-based protocol, hence the focus on Strings. The string-based code injections includes a broad scope of vulnerabilities, such as SQL injections, XSS, remote command injections, JavaScript object notation (JSON) injections, single mail transfer protocol (SMTP) injections, etc. Such vulnerabilities may be exploited by an attacker controlling the source (e.g., 110 via 105). As a result, potentially damaging or exposing string flows may be processed at a security sensitive sink (e.g., 120). Harmful strings may be placed in input fields and forms, uniform resource locators (URLs), etc.).

A framework focused on tainting string flows may provide a high level of protection and accuracy, minimizing the overhead. Therefore, without limiting only to string data, the description below often refers to taint tracking of strings, e.g., character sequences. For example, user input 105 may be a sequence of characters representing user identification (ID). This sequence of characters can be passed from source 110 to sink 120 via application 115 using a string class.

In one embodiment, the character string provided at user input 105 is marked or tainted, e.g., at source 110. The tainted string is tracked at application 115 and passed to sink 120 together with the assigned tainting information. Based on the tainting metadata, sink 120 may handle the string in a way that would avoid or mitigate any potential security or functional issue. Accordingly, the tainting framework of FIG. 1 provides reliable and efficient receiving, tracking and passing of tainting information together with the respective dataflows by applications (e.g., 115) during their execution (e.g., at runtime 125).

FIG. 1 is supplemented with two exemplary listings representing scenario 1 (130) and scenario 2 (135) to illustrate the tainting of potentially harmful strings passed from source 110 to sink 120 via application 115. For example, when an existing ID is entered, e.g., in a web application field, corresponding user data can be accessed. Respectively, the entry may be used to form a SQL statement (e.g., at 110) and passed to application 115 as a string. Additionally, taint information may be assigned in the form of a string with the same length as the SQL statement, where one type of characters (e.g., "0") positionally correspond to the secure parts of the SQL statement, whereas another type of characters (e.g., "1") positionally correspond to the potentially damaging parts (e.g., the user entry).

Scenario 1 (130) shows that "123" is received as ID input. The SQL statement formed as a result is "SELECT * FROM users WHERE id=123;", and the assigned tainting metadata is the string "00000000000000000000000000001110". As illustrated, the three characters "1" positionally correspond to the ID "123".

In scenario 2 (135) the ID that is entered is "1 OR 1=1". Respectively, the SQL statement formed based on the entry is "SELECT * FROM users WHERE id=1 OR 1=1;". The assigned tainting string is "00000000000000000000000000111111110". The SQL statement of scenario 2 (135) is potentially harmful as the "WHERE" clause is always true. Thus, the whole table "users" will be selected. The tainting information, when tracked by one or more applications (e.g. 115 executed in taint-aware runtime 125) and passed to sink 120, may be used to prevent the execution of the SQL, e.g., by preprocessing the marked part of the SQL statement.

In one embodiment, a taint-aware data class is defined to enable the tracking of tainted dataflows. A taint-aware class may contain a field (e.g., a payload field to store an underlying object or instance of the original data class), and a separate field (e.g., a tainting or metadata field) to store taint information assigned to the object of the original data class. The tainting field of the taint-aware data class could be accessed and manipulated by public methods. The taint-aware data class could implement the methods of the underlying original data class. Thus, a method implemented by the taint-aware class may first store and/or propagate taint information, and then call a corresponding method of the underlying original data class, e.g., acting as a proxy or a wrapper, shadowing the original data class.

This description includes examples, terms and references pertinent to Java technology, however, one skilled in the art would recognize that similar techniques could apply to other, e.g., non-Java environments and embodiments.

Table 1 lists code snippets illustrating a taint-aware Java class "TString" shadowing the original "String" Java class. In the provided example, the tainting information is represented by a simple Boolean flag to mark a string as either tainted or not. Other implementations may be possible, e.g., that allow tracking more detailed tainting information, such as the character-based or range-based. For example, the tainting mode illustrated in scenario 1 (130) and scenario 2 (135) of FIG. 1 can be achieved in a similar way. In this mode, different ranges of the string to be tainted may be flagged differently instead of limiting the tainting to a single flag. In one embodiment, the mode of tainting may determine the data type of the field added to the taint-aware class to store the tainting metadata. Furthermore, in one embodiment, the tainting mode could be configurable.

TABLE 1

```
1    public class TString {
2        // Field to store the underlying String data
3        private String str;              // wrapped String object
4        // Field storing taint information
5        private boolean tainted;         // can be more complex
6
7        // Example constructor with default values
8        public TString( ) {
9            this.str = "";
10           this.tainted = false;
11       }
12
13       // Constructor which also sets the taint information
14       public TString(String s, boolean tainted) {
15           this.str = s;
16           this.tainted = tainted;
17       }
18
19       // Taint getter
20       public boolean isTainted( ) {
21           return this.tainted;
22       }
23
24       // Taint setter
25       public void setTaint(boolean b) {
26           this.tainted = b;
27       }
28
29       // Example constructor implementing a String constructor and creating a
30   new
31       // underlying String
32       public TString(char value[ ]) {
33           this.str = new String(value);
34       }
35
36       // ... other String constructors
37
38       public TString replace(char oldChar, char newChar) {
39           // Call the underlying String method and propagate taint information
40           return new TString(this.str.replace(oldChar, newChar),
41       this.tainted);
42       }
43
44       public TString replaceAll(TString regex, TString replacement) {
45           boolean taint = this.tainted;
46           Pattern p = Pattern.compile(regex.str);
47           Matcher m = p.matcher(this.str);
48           if (m.find( )) {
49               // Propagate taint information if necessary
50               taint |= replacement.tainted;
51           }
52           // Call and return the underlying String method
53           return new TString(this.str.replaceAll(regex.str,
                 replacement.str),
54               taint);
55       }
56
         // ... other String methods
     }
```

For example, the TString class defines public methods that could be called during runtime to set tainting (e.g., setTaint) and check whether a string is tainted (e.g., isTainted). For example, a source application may assign tainting to user inputs, and a sink application may check the tainting and take action based on it (e.g., reporting, analyzing, blocking, etc.). Other public methods may be defined as shells for the corresponding public methods of the underlying original data class (String). As shown in Table 1, such a method is "replace" that is defined as TString method to call the original String "replace" method and to propagate taint information.

The approach of wrapping the original data class (e.g., String) instead of instrumenting it directly to enable the taint-tracking (e.g., adding a field for tainting metadata) is agnostic to the implementation of the underlying original methods. The runtime, e.g., the Java Virtual Machine (JVM) may execute class (String) methods in interpreted mode, e.g., as defined in class files. Another mode is Just-in-time (JIT) compilation mode. In JIT mode, additional optimizations can occur when the Java standard library class methods are no longer executed, but instead are replaced with pre-compiled function calls known as intrinsics (natively implemented or built-in methods). If the bytecode of the original classes is instrumented directly (Java Standard Library) and the JVM switches to calling intrinsic methods (e.g., for better performance), the instrumented class methods will not be executed, and the tainting information would be lost. In one embodiment, taint information is seemingly propagated by the taint-aware wrapper class (e.g., TString), regardless the mode of execution of the methods of the underlying data class (e.g., String).

Taint-aware classes may be defined also for string-like Java classes, e.g., StringBuffer and StringBuilder, as well as for auxiliary classes, e.g., Formatter. Thus, the public methods that relate to string data are proxied to ensure the tracking of the taint information. In one embodiment, the instances of String and String-like classes in an application where taint tracking is desirable are replaced with corresponding instances of the defined corresponding taint-aware wrapper classes (e.g., TString, TStringBuffer, TStringBuilder, etc.).

Figure 2:
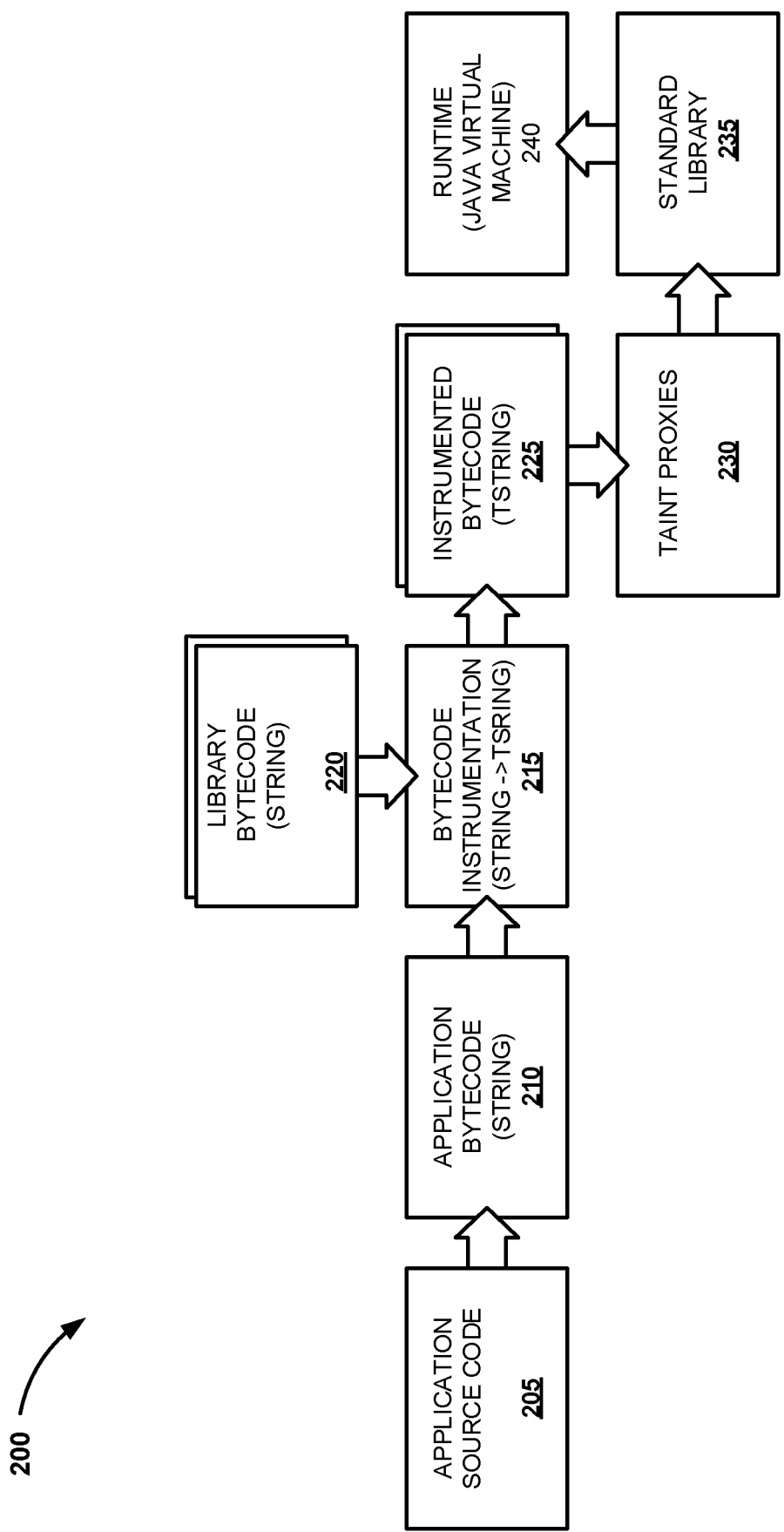
FIG. 2 is a block diagram illustrating a computer system, enabling the replacement of an original data class with a taint-aware class, according to one embodiment.

FIG. 2 illustrates system 200 enabling the replacement of an original data class with a taint-aware class in an application, according to one embodiment. Application source code 205 could be compiled to application bytecode 210, e.g., in the usual manner. For example, that means the String class instances are not affected during the compilation to bytecode. Further, at module 215, the instances of the original data class or classes (e.g., String, StringBuffer, StringBuilder) in application bytecode 210 are replaced with corresponding instances of taint-aware class or classes (e.g., TString, TStringBuffer, TStringBuilder). The definitions of the taint-aware class/es, including their structure and methods are provided, e.g., as bytecode libraries. For example, the definitions of TString and the string-like classes are provided in library bytecode 220.

The bytecode instrumented with the taint-aware class/es instances (225) is uploaded and executed, e.g., at runtime 240. In one embodiment, taint-aware class (e.g., TString) methods propagate tainting information and call the corresponding underlying original data class (e.g., String) methods. In other words, taint proxies 230 (e.g., TString methods) shadow Standard Library 235 (String methods) providing taint tracking without altering either the Standard Library code and/or definitions (235) or the runtime (240) itself (e.g., when the runtime executes intrinsics superseding the methods in the standard libraries).

Figure 3:
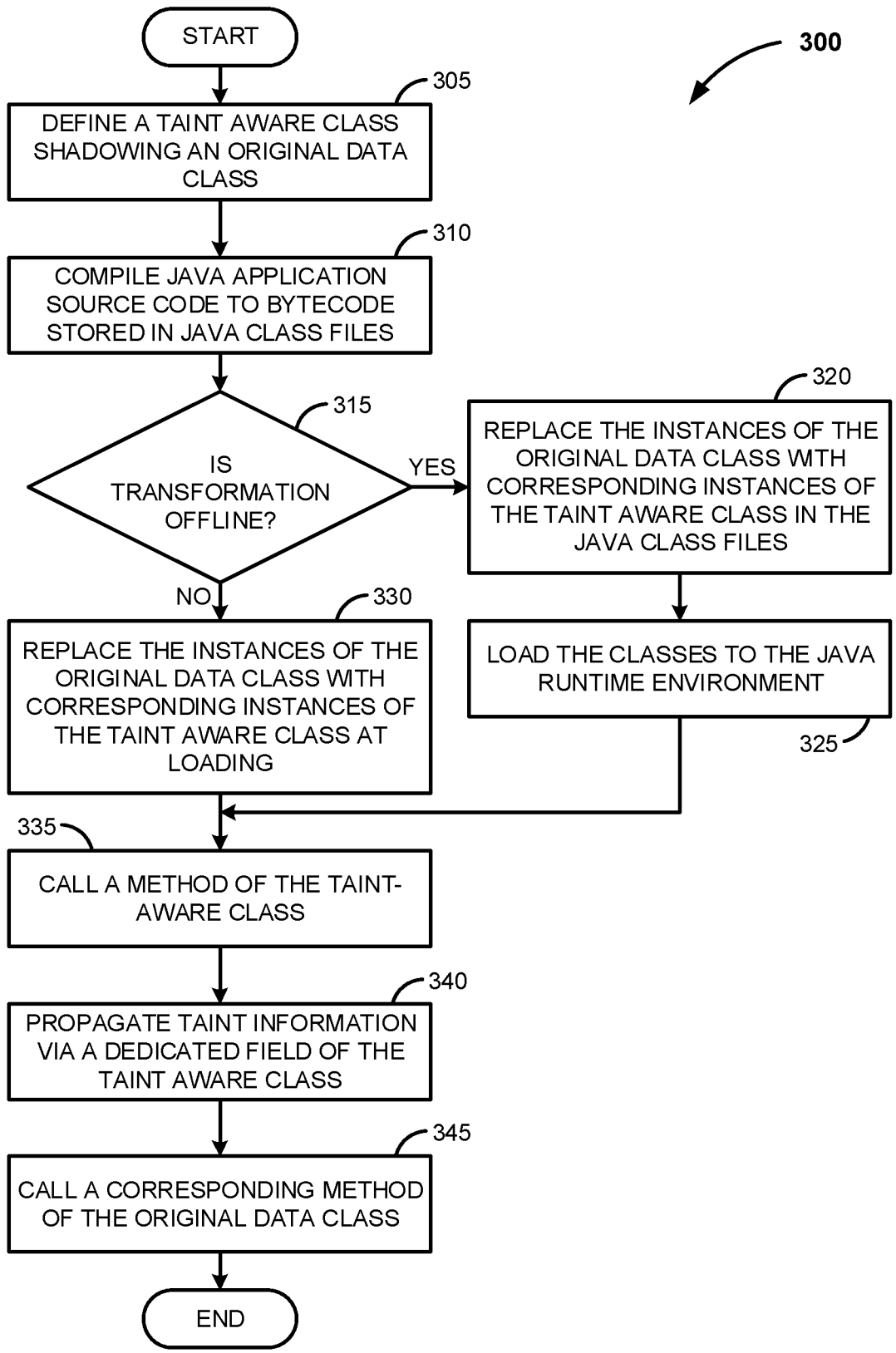
FIG. 3 is a flow diagram that illustrates a process to track tainting, according to one embodiment.

Process 300 shown in FIG. 3 illustrates at least some of the activities involved in taint-tracking via non-intrusive Java bytecode instrumentation, according to one embodiment. At 305, a taint-aware class is defined to schedule an original data class. For example, TString is defined to schedule String Java class. TString includes an additional field for tracking tainting information. Further, TString includes methods that propagate taint information and refer to corresponding methods of String (see Table 1).

At 310, an application is compiled to bytecode as usual. After that, the instances of the original data class are replaced with corresponding instances of the taint-aware data class. The transformation that results in injecting the defined taint-aware class/es to replace the underlying original data class/es can be performed at two separate points in the application's lifecycle. At 315, it is checked or decided whether the transformation should be executed offline. In one embodiment, the decision whether to execute the transformation offline may be be pre-configured, e.g., by a user as a configuration option. When executed offline, application class file/s and their dependencies are transformed in a separate step before execution. Thus, at 320, the instances of the original data class/es are replaced with corresponding instances of the taint-aware class/es (e.g., in the ".class" and/or "jar" Java class files). The transformed application and dependencies are loaded to the runtime in the usual way, at 325.

When the transformation is online instead of offline, the instances of the original data class/es are replaced with the instances of the taint-aware class/es as they are loaded, at 330. For example, JVM implementations provide a functionality called Java agents. Through this functionality, it is possible to register agents that can interact with the class loading mechanism. For example, it is possible to transform Java bytecode while a class is being loaded. Thus, classes can be dynamically instrumented "on-the-fly" at loading, as the JVM starts using them. This will make the transformation easier and more reliable, e.g., when an application involves multiple resources which may be dynamically loaded.

In one embodiment, a Java agent may be configured at the JVM to handle the transformation dynamically. In this mode, a separate transformation or build step may not be necessary. The JVM may be started with additional arguments or configuration to enable the Java agent to transform the application with taint-awareness at loading (e.g., "—javaagent:taintingtransformation.jar"). The online transformation mode, however, may impact the performance on application startup as the class instances of the standard class/es are automatically replaced with the corresponding instances of the taint-aware class/es.

Typically, the functionality of a Java application is provided via more than a single "jar" file. For example, a complex Java application may reside in several application containers which allow loading of functionality at run-time. Additionally, Java applications can dynamically load new code from the network during execution. Therefore, a purely offline instrumentation may not be feasible for all use cases. Accordingly, the online mode or a combination between offline and online modes would be advantageous.

Once the application is loaded, at 335, a method that refers to an instance of the taint-aware data class is called, e.g., during the execution of the application. The method of the taint-aware data class could be called instead of a method of the original data class due to the instrumentation. The call of such a wrapper method proxies the call to the original method to manage taint information, e.g., via a dedicated field of the taint-aware class, at 340. Further, the proxy method calls the original method, e.g., the corresponding method of the original data class, at 345, to perform the intended operation on the data of the instance of the taint-aware data class (the dataflow). Accordingly, the standard methods functionality is not affected. However, functionality is added to the taint-aware proxy methods to handle the tainting information as appropriate or in accordance with the operation the original method performs on the data to which the tainting is assigned (e.g., on the string passed from a source to a sink).

FIG. 4 shows exemplary snippets of Java source code 405 compiled to bytecode 410, and further instrumented to replace String class instances with TString class instances 415. In an embodiment, Java Standard Library classes are not instrumented. Instead, the calls to Java Standard Library class methods which accept String arguments are proxied. If a method manipulates a String class, a wrapper method is inserted to correctly propagate the taint information. Otherwise, the underlying String is simply passed on to the Standard Library method.

Reflection in Java allows code execution based on values which are only known at run-time. For example, instances of classes can be loaded by reflection using the "Class.for-Name( )" method, as shown in FIG. 4, 420. To address this, calls to the "Class.forName( )" method are overwritten so that the corresponding taint-aware class is returned if applicable. For example, in 420, the taint-aware Class.forName( ) method will recognize that "java.lang.String" requires transformation to TString, and will return the corresponding TString class.

Taint-tracking by manipulating bytecode, e.g., of Java applications, ensures portability in that the resulting manipulated bytecode can be executed on any runtime (Java Virtual Machine) implementation. This is advantageous over solutions that implement taint-tracking by instrumenting the runtime (e.g., JVM). Since just bytecode is affected, no source code access or modification may be required for implementing taint tracking in an application. Accordingly, this approach is appliable also to third-party libraries and/or applications for which source code is not always available.

As mentioned, solutions that rely on bytecode manipulation also suffer in the cases where native and intrinsic functions are called within the runtime (e.g., JVM). For example, to improve performance, a JVM can compile Java bytecode into machine code to improve performance (JIT compilation) or in some cases replace Java methods with pre-compiled native implementations (intrinsics). Thus, methods of the data classes for which bytecode is instrumented may not be called, replaced by such intrinsics. Accordingly, such taint tracking solution will not be portable without manipulating the JVM itself. In addition, existing tainting solutions which employ bytecode manipulation attempt to offer a complete framework to track every data type, leading to serious performance penalties. By focusing on one data type, and more specifically, on String and String-like classes, the performance overhead is limited while handling the most relevant security vulnerabilities.

Figure 5:
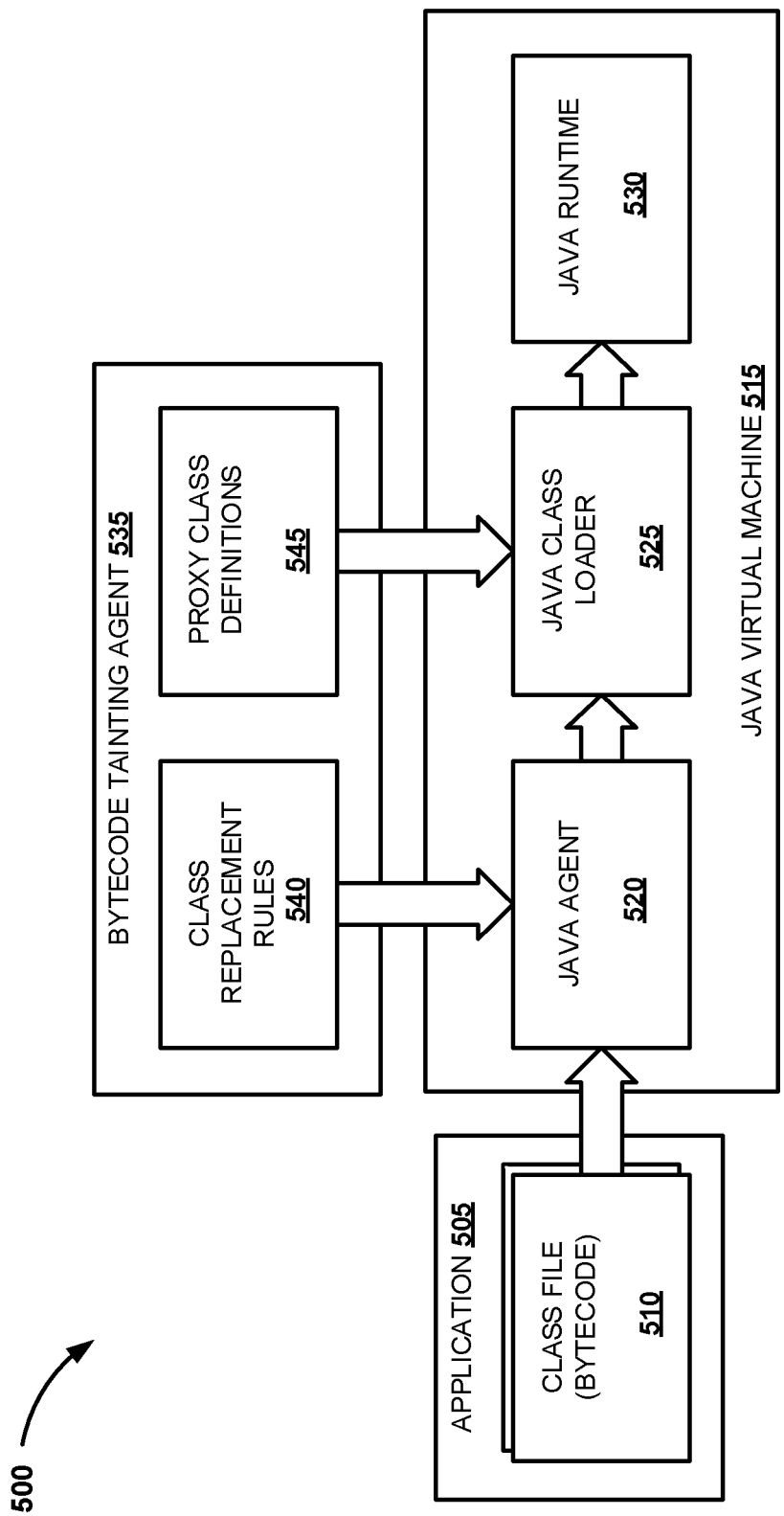
FIG. 5 is a block diagram illustrating a system dynamically instrumenting bytecode, according to one embodiment.

FIG. 5 shows system 500 to dynamically or online instrumenting bytecode at loading, according to one embodiment. Class/es 510 of application 505 are loaded at JVM 515 by Java class loader 525. During the loading process, Java agent 520, registered in the JVM 515, interacts with the class loading mechanism (loader 525). Bytecode tainting agent 535 may be a resource (e.g., a "jar" file) providing the functionality required for dynamically replacing the original data class instances in the application bytecode with the corresponding taint-aware class instances, at loading. This functionality may include class replacement rules 540 applied during the instrumentation of the application class files 510.

Further, the bytecode tainting agent 535 may include the definitions (545) of the proxy taint-aware class/es (TString, TStringBuffer, TStringBuilder, etc.). Proxy class definitions 545 may be implemented at the JVM 515 directly by Java class loader 525 following the usual execution as there may be no transformation of these definitions by the Java agent 520. Application 505, loaded and transformed in the described way, is executed at Java runtime 530, tainting and taint tracking enabled. Java runtime may execute the methods of the standard data classes either as they are loaded by Java class loader 525, or as they are internally defined (if any) in the JVM 515. Thanks to defining the taint-aware methods as wrappers or proxies to the original methods, the taint-tracking at the runtime (530) is not affected. Furthermore, such taint-tracking mechanism is portable to other JVMs, as the JVMs are not altered by it. Just an argument or a configuration for the corresponding Java agent (e.g., one line reference) of a JVM would be added to support taint-tracking.

Figure 6:
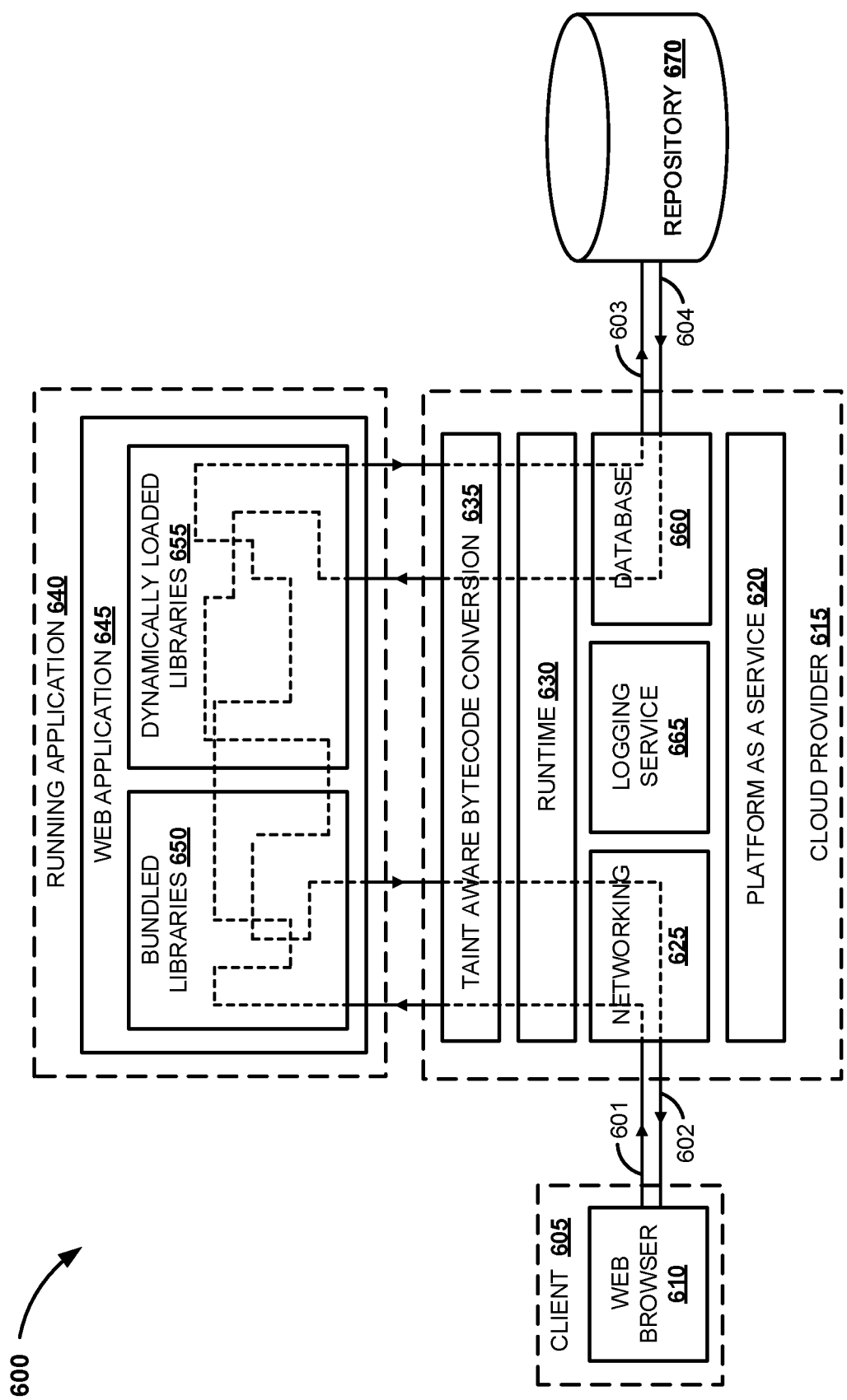
FIG. 6 is a block diagram illustrating cloud-based computing environment where taint-tracing is implemented, according to one embodiment.

FIG. 6 shows cloud-based environment 600 where taint-tracking is implemented, according to one embodiment. For example, cloud provider 615 delivers platform as a service (PaaS) 620 to customers. The services available at PaaS 620 may include hardware and software resources for application development and execution. Further, integral cloud services are available to customers, such as networking 625, logging 665, database 660, etc.

For example, networking 625 provides networking resources through a centralized third-party provider operating inter-connected servers (e.g., cloud provider 615 or a third-party customer of PaaS 620, e.g., as network as a service). This involves connecting to a Wide Area Network (WAN) and/or other internet-based technology, to distribute content quickly and securely. Similarly, database 660 can provide access to a third-party storage services (e.g., secured by cloud provider 615 or by a third-party customer of PaaS 620, e.g., database as a service). Logging service 665 can enable customers to manage, analyze, monitor, and gain insights from log data in real time. Logging service 665 may be established by cloud provider 615 or/and by third-party cloud service providers (e.g., logging as a service).

Various execution platforms and application environments may be built on top of PaaS 620 (e.g., by customers of PaaS 620) to run applications accessed by clients of the PaaS (620) customers or by third-party clients. For example, the cloud (e.g, including PaaS 620 and the additional system services such as networking 625, database 660 and logging 665) may be used to host Java runtime 630 (e.g., Java runtime environment (JRE), where JVM instance/s are executed). Various customers or/and third party provided applications may be executed at Java runtime 635.

In one embodiment cloud run application 640 may include web application 645, where web application is accessible by clients (e.g., client 605) via web browsers (e.g., web browser 610). As a Java application, web application 645 may rely upon a core set of functionalities provided by the application source (e.g., "jar" file/s) and by core libraries bundled at startup (650). Further, some of the functionality of web application 645 may be delivered by libraries loaded dynamically during execution (655).

In one embodiment, cloud-based environment 600 supports taint-tracking across the provided services and executed applications via non-intrusive application bytecode instrumentation. As shown in FIG. 6, the non-intrusive bytecode instrumentation may be delivered by taint-aware bytecode conversion module 635 provided without altering Java runtime 630. In one embodiment, Taint-aware bytecode conversion 635 provides definitions to the taint-aware data classes to wrap around and proxy the original data classes (e.g., TString wrapping String). Further taint-aware bytecode conversion may instrument the application (web application 645) to replace the instances of the original data class/es with corresponding instances of the taint-aware data class/es. This instrumentation may be executed via Java agent functionality of Java runtime 630, during application start (e.g., instrumenting bundled libraries 650 bytecode) or/and during execution (e.g., instrumenting dynamically loaded libraries 655 at loading).

In one embodiment, client 605, via web browser 610, may trigger a dataflow 601 towards web application 645 executed at cloud (cloud provider 615). For example, the dataflow may result from a potentially malicious HTTP (Hypertext Transfer Protocol) request. Accordingly, dataflow 601 may include metadata corresponding to taint information assigned to the dataflow either at client 605 or at web application 645. The taint metadata could be set, e.g., using a method defined for setting the taint metadata field of the corresponding taint-aware class instance. For example, we can add "setTaint" call by transforming the bytecode just after calls to the corresponding source function as part of 635. The taint metadata can be tracked and managed during the execution of web application 645 at cloud-based runtime 630 thanks to replacing the original data class/es instances with corresponding taint-aware class/es instances.

If the execution of web application 645 leads to a dataflow outside the web application (e.g., to a sink), the relevant metadata also can be transferred, e.g., using appropriately defined taint-aware class methods. Thus, web application 645 may rely on database service 660 to forward dataflow 603 (resulting from data inflow 601) to be processing at repository 670. Dataflow 603 may include tainting metadata to be used at repository 670, e.g., to avoid security breaches. For example, dataflow 603 may include SQL statement formed based on an input provided at web browser 610 via dataflow 601, paired with tainting metadata marking the SQL statement as tainted (e.g., see scenario 1 130 and 2 135 of FIG. 1). Warned by the tainting, repository 670 may halt the execution of the SQL statement (603), e.g., until being tested.

In one embodiment, tainting a variable or a string may be assigned not only to the user input to mark potential security risk, but as FIG. 6 shows, the tainting mechanism as established may be used to mitigate the risk of extracting and sending back to web browser 610 inappropriate information, e.g., included in dataflows 604 and 602. Accordingly, dataflows 604 and 602 may include tainting metadata. Thus, the tainting framework implemented in cloud environment 600 can monitor the result from the processing of dataflow 603 and help mitigating the potential risks (e.g., exposure of sensitive information). The tainting metadata associated with dataflow 604 is tracked and/or managed through web application 645, and can be passed to client 605, e.g., as associated with dataflow 602.

In one embodiment, logging service 665 may be used to store taint-relevant metadata from different stakeholders, different executing applications, etc. Such information could be processed in further analyses for different purposes, e.g., reporting, threat patterning, vulnerabilities identification, etc.

Some embodiments may include the above-described methods being written as one or more software components.

These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
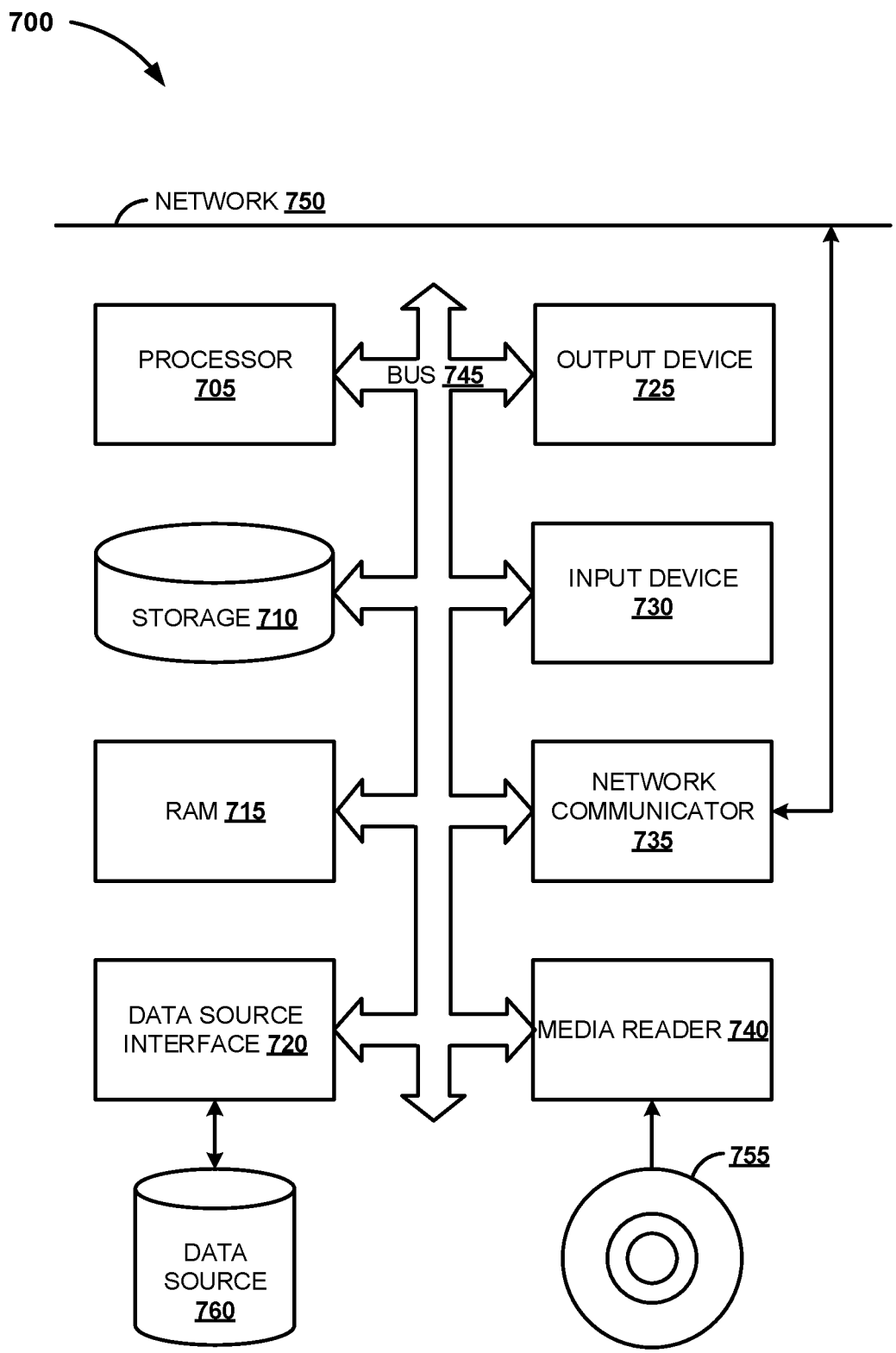
FIG. 7 is a block diagram of an exemplary computer system to execute taint-tracking, according to one embodiment.

FIG. 7 is a block diagram of exemplary computer system 700 system to execute taint-tracking, according to one embodiment. Computer system 700 includes processor 705 that executes software instructions or code stored on computer readable storage medium 755 to perform the above-illustrated methods. Computer system 700 includes media reader 740 to read the instructions from computer readable storage medium 755 and store the instructions in storage 710 or in random access memory (RAM) 715. Storage 710 provides space for keeping static data where at least some instructions could be stored for later execution. The stored instructions may be further compiled to generate other representations of the instructions and dynamically stored in RAM 715. Processor 705 reads instructions from RAM 715 and performs actions as instructed. According to one embodiment, computer system 700 further includes output device 725 (e.g., a display) to provide at least some of the results of the execution as output including, but not limited to, visual information to users; and input device 730 to provide a user or another device with means for entering data and/or otherwise interact with computer system 700. Output device 725 and input device 730 could be joined by one or more additional peripherals to further expand the capabilities of computer system 700. Network communicator 735 may be provided to connect computer system 700 to network 750 and in turn to other devices connected to network 750 including other clients, servers, data stores, and interfaces, for instance. The modules of computer system 700 are interconnected via bus 745. Computer system 700 includes data source interface 720 to access data source 760. Data source 760 can be accessed via one or more abstraction layers implemented in hardware or software. For example, data source 760 may be accessed via network 750. In some embodiments data source 760 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system to track tainted data flows comprising:
    at least one operative memory device to store instructions; and
    at least one processor coupled to the at least one operative memory device to execute the instructions to:
        generate a taint-aware class comprising:
            a payload field to store objects of an original data class;
            a metadata field to store tainting information correspondingly assigned to the objects of the original data class, wherein the metadata field comprises a binary string, each bit of the binary string comprising an indication of whether a corresponding character of at least one of the objects is potentially damaging; and
        perform a method to:
            access the metadata field,
            proxy a corresponding method of the original data class to access the payload field, and
            replace instances of the original data class of a bytecode of an application with corresponding instances of the taint aware class; and wherein
        in response to a call during an execution of the application in a runtime environment, the method of the taint aware class manages the content of the metadata field and calls the corresponding method of the original data class to manage the content of the payload field.

2. The system of claim 1, wherein the at least one processor to execute the instructions further to:
    instrument one or more bytecode files to replace each reference to the original data class with a corresponding reference to the taint-aware class, wherein the one or more bytecode files store the bytecode of the application; and
    load the bytecode of the application to the runtime environment from the instrumented one or more bytecode files.

3. The system of claim 1, wherein the at least one processor to execute the instructions further to:
    replace each reference to the original data class with a corresponding reference to the taint-aware class at loading the bytecode of the application to the runtime from one or more bytecode files.

4. The system of claim 3, wherein the replacing is executed by a configurable agent of the runtime environment.

5. The system of claim 1, wherein managing the content of the metadata field comprises one or more of:
    receiving the metadata from a source;
    sending the metadata to a sink; and
    propagating the metadata between instances of the taint-aware class.

6. A non-transitory machine-readable medium to store instructions, which when executed by a computer, cause the computer to perform operations comprising:
    replace instances of an original data class with instances of a taint aware class in a bytecode of an application, wherein the taint-aware class comprises:
        a payload field to store objects of the original data class;
        a metadata field to store tainting information correspondingly assigned to the objects of the original data class, wherein the metadata field comprises a binary string, each bit of the binary string comprising an indication of whether a corresponding character of at least one of the objects is potentially damaging; and
    perform a method to:
        access the metadata field and proxy a corresponding method of the original data class to access the payload field; and in response to a call during an execution of the application in a runtime environment, the method of the taint aware class is to:
    manage the content of the metadata field; and
    call the corresponding method of the original data class to manage the content of the payload field.

7. The machine-readable medium of claim 6, wherein replacing the instances comprises:
    instrumenting one or more bytecode files to replace each reference to the original data class with a corresponding reference to the taint-aware class, wherein the one or more bytecode files store the bytecode of the application; and
    loading the bytecode of the application to the runtime environment from the instrumented one or more bytecode files.

8. The machine-readable medium of claim 6, wherein replacing the instances comprises:
    replacing each reference to the original data class with a corresponding reference to the taint-aware class at loading the bytecode of the application to the runtime from one or more bytecode files.

9. The machine-readable medium of claim 8, wherein the replacing is executed by a configurable agent of the runtime environment.

10. The machine-readable medium of claim 6, wherein the metadata field is of a data type determined by a preconfigured tainting mode.

11. The machine-readable medium of claim 6, wherein managing the content of the metadata field comprises one or more of:
    receiving the metadata from a source;
    sending the metadata to a sink; and
    propagating the metadata between instances of the taint-aware class.

12. A computerized method to track tainted data flows comprising:
    replacing instances of an original data class with instances of a taint aware class in a bytecode of an application, wherein the taint-aware class comprises:
        a payload field to store objects of the original data class;
        a metadata field to store tainting information correspondingly assigned to the objects of the original data class, wherein the metadata field comprises a binary string, each bit of the binary string comprising an indication of whether a corresponding character of at least one of the objects is potentially damaging; and
    performing a method to access the metadata field and proxy a corresponding method of the original data class to access the payload field; and
    in response to a call during an execution of the application in a runtime environment, the method of the taint aware class is to:
        manage the content of the metadata field; and
        call the corresponding method of the original data class to manage the content of the payload field.

13. The method of claim 12, wherein replacing the instances comprises:
    instrumenting one or more bytecode files to replace each reference to the original data class with a corresponding reference to the taint-aware class, wherein the one or more bytecode files store the bytecode of the application; and
    loading the bytecode of the application to the runtime environment from the instrumented one or more bytecode files.

14. The method of claim 12, wherein replacing the instances comprises:
    replacing each reference to the original data class with a corresponding reference to the taint-aware class at loading the bytecode of the application to the runtime from one or more bytecode files.

15. The method of claim 14, wherein the replacing is executed by a configurable agent of the runtime environment.

16. The method of claim 12, wherein the metadata field is of a data type determined by a tainting mode.

17. The method of claim 12, wherein managing the content of the metadata field comprises one or more of:
    receiving the metadata from a source;
    sending the metadata to a sink; and
    propagating the metadata between instances of the taint-aware class.

* * * * *